United States Patent [19]
Boelkins

[11] Patent Number: 6,012,903
[45] Date of Patent: Jan. 11, 2000

[54] POSITIVE-DISPLACEMENT LIQUID-METERING PUMP WITH CONTINUOUSLY VARIABLE OUTPUT

[75] Inventor: Wallace G. Boelkins, Grand Rapids, Mich.

[73] Assignee: Uni-Mist, Inc., Grand Rapids, Mich.

[21] Appl. No.: 08/888,577

[22] Filed: Jul. 7, 1997

Related U.S. Application Data

[60] Provisional application No. 60/022,046, Jul. 22, 1996.

[51] Int. Cl.$^7$ ............................. F01B 31/14; F04B 49/00
[52] U.S. Cl. ............................................. 417/63; 92/13.8
[58] Field of Search ............................. 417/63; 92/13.7, 92/13.8, 13.5

[56] References Cited

U.S. PATENT DOCUMENTS

| | | | |
|---|---|---|---|
| 2,189,765 | 2/1940 | Takats | 118/259 |
| 2,367,721 | 1/1945 | Gothberg et al. | |
| 2,373,555 | 4/1945 | Folke | |
| 2,390,001 | 11/1945 | Schindler | |
| 2,404,052 | 7/1946 | Ginter | |
| 2,461,076 | 2/1949 | Neeson | |
| 2,611,336 | 9/1952 | Sachs | 118/227 |

(List continued on next page.)

FOREIGN PATENT DOCUMENTS

| | | |
|---|---|---|
| 532050 | 10/1956 | Canada . |
| 0235425 | 9/1987 | European Pat. Off. . |
| 4105364 | 5/1992 | Germany . |
| 177817 | 4/1922 | United Kingdom . |
| 410094 | 5/1934 | United Kingdom . |
| 505353 | 5/1939 | United Kingdom . |
| WO9100150 | 1/1991 | WIPO . |

OTHER PUBLICATIONS

Serv–Oil–SSL Preliminary Bulletin, 1969.
Serv–Oil Publication, 1969.
"Strip and Sheet Stock Oliers" (1989) from Stamping Specialty Co., Inc., 1989.
"Strip and Sheet Stock Oilers" by Stamping Specialty Co., Inc.

*Primary Examiner*—John J. Vrablik
*Attorney, Agent, or Firm*—Price, Heneveld, Cooper, DeWitt & Litton

[57] ABSTRACT

A piston-type positive-displacement liquid-metering pump with an output-control apparatus for varying the pump output volume per piston stroke by very minute amounts on a smoothly gradual and continuous basis, in which an actuator or actuation portion of the piston has an associated stop structure for limiting its allowable movement to thereby limit the output volume produced on each stroke of the piston, and an indexing member disposed in alignment with the stop structure and having a portion engageable therewith to effect the aforementioned limitation on allowable piston movement and thus define the stroke length of the piston. A continuously variable coupling is operatively disposed between the indexing member and the pump body and/or the indexing member, for changing the effective position of the stop structure relative to the pump body or indexing member and thus changing the allowable length of the piston stroke. Preferably, the stop structure comprises an abutment member such as a spring clip secured along the length of the piston, and the indexing member comprises a co-acting abutment structure disposed in a position to be contacted by the spring clip or other stop carried on the piston. The continuously variable coupling preferably comprises a threaded interconnection between the indexing member and the pump body or a coupling member carried by the body. In a particular preferred embodiment, the threaded connection just noted is implemented by cooperating structures which provide a Vernier-type readout such as that utilized in micrometers, in which an internally threaded barrel-like member has an end extremity which is movable along and relative to an underlying series of indicia, providing a desirable visual indication of the different positions of adjustment resulting from variation of the threaded engagement.

26 Claims, 2 Drawing Sheets

6,012,903

Page 2

U.S. PATENT DOCUMENTS

| | | | |
|---|---|---|---|
| 2,614,526 | 10/1952 | Zaber et al. | 118/227 |
| 2,633,822 | 4/1953 | Watterson et al. | 118/227 |
| 2,676,315 | 4/1954 | Kyle . | |
| 2,792,911 | 5/1957 | Harter . | |
| 2,870,737 | 1/1959 | Byrnes | 118/227 |
| 2,894,481 | 7/1959 | Stuchbery . | |
| 3,059,860 | 10/1962 | Hohn . | |
| 3,191,720 | 6/1965 | Stryker . | |
| 3,227,378 | 1/1966 | Stewart . | |
| 3,266,735 | 8/1966 | Webb . | |
| 3,286,931 | 11/1966 | Webb . | |
| 3,379,170 | 4/1968 | Thomas et al. . | |
| 3,389,799 | 6/1968 | Thrasher, Jr. . | |
| 3,416,489 | 12/1968 | Hoffmann . | |
| 3,421,600 | 1/1969 | Gleason et al. . | |
| 3,456,882 | 7/1969 | Walker . | |
| 3,472,277 | 10/1969 | Reinicke et al. . | |
| 3,478,843 | 11/1969 | Eckardt . | |
| 3,481,431 | 12/1969 | Dorsey . | |
| 3,561,680 | 2/1971 | Ott | 239/411 |
| 3,595,342 | 7/1971 | O'Leary . | |
| 3,618,709 | 11/1971 | Boelkins | 184/6.4 |
| 3,653,466 | 4/1972 | Fujita et al. . | |
| 3,693,757 | 9/1972 | Callahan et al. . | |
| 3,805,738 | 4/1974 | Kitazawa | 118/227 |
| 3,868,195 | 2/1975 | Anderson et al. | 184/6.26 |
| 3,888,420 | 6/1975 | Boelkins | 184/7.4 |
| 3,926,279 | 12/1975 | Thrasher | 184/29 |
| 4,029,833 | 6/1977 | Kosta | 427/428 |
| 4,064,970 | 12/1977 | Reeves | 184/15.3 |
| 4,067,414 | 1/1978 | Funke | 137/846 |
| 4,169,520 | 10/1979 | Lewkowicz et al. | 184/7.4 |
| 4,295,545 | 10/1981 | Hiei | 184/55.2 |
| 4,324,316 | 4/1982 | Thrasher, Jr., et al. | 184/29 |
| 4,345,668 | 8/1982 | Gaunt | 184/29 |
| 4,391,620 | 7/1983 | Geisel | 65/26 |
| 4,533,020 | 8/1985 | Yamazaki | 184/55.2 |
| 4,641,404 | 2/1987 | Seydel et al. | 28/178 |
| 4,735,286 | 4/1988 | Miki et al. | 184/64 |
| 4,754,848 | 7/1988 | Azzopardi et al. | 184/6.26 |
| 4,856,966 | 8/1989 | Ozawa | 417/214 |
| 5,002,156 | 3/1991 | Gaunt | 184/39.1 |
| 5,074,757 | 12/1991 | Horn | 417/63 |
| 5,154,259 | 10/1992 | Magome | 184/7.4 |
| 5,205,378 | 4/1993 | Boelkins | 184/55.1 |
| 5,254,108 | 10/1993 | Burrell et al. | 604/289 |
| 5,395,447 | 3/1995 | Wu | 118/227 |
| 5,476,546 | 12/1995 | Zibulla | 118/668 |
| 5,524,729 | 6/1996 | Boelkins | 184/55.1 |
| 5,542,498 | 8/1996 | Boelkins | 184/7.4 |

POSITIVE-DISPLACEMENT LIQUID-METERING PUMP WITH CONTINUOUSLY VARIABLE OUTPUT

CROSS-REFERENCE TO RELATED APPLICATION

This application claims priority under 35 U.S.C. §119(e) on U.S. Provisional Application Ser. No. 60/022,046 entitled POSITIVE-DISPLACEMENT LIQUID-METERING PUMP WITH CONTINUOUSLY VARIABLE OUTPUT filed Jul. 22, 1996, by Wallace G. Boelkins, the entire disclosure of which is incorporated herein by reference.

FIELD OF ART

This invention relates generally to the field of liquid-metering and pumping devices, particularly those used for industrial and other such commercial purposes to repetitively meter out and dispense predetermined quantities of lubricants, coolants and the like for application to selected working parts of other machinery, for example, in cutting, shaping or other such machining operations, and a variety of other such commercial or professional applications.

More particularly, the invention relates to apparatus and methodology for highly accurate and continuously variable control of such liquid-metering and pumping apparatus, in particular those which employ reciprocating piston pumps as the metering and discharging means.

BACKGROUND

By way of background, reference is made to Applicant's prior U.S. Pat. Nos. 3,618,709, 3,888,420 and 5,205,378, as well as co-pending applications Ser. Nos. 07/269,636 and 07/271,001, filed Jul. 1 and 7, 1994, (now U.S. Pat. Nos. 5,542,498 and 5,524,729), and 08/570,806, filed Dec. 12, 1995, together with the various references cited of record therein, all of which are incorporated herein by reference. Collectively, these various references illustrate and describe a number of different components and systems for use in the above field, including generally known forms of a longitudinally reciprocal piston pin-type positivedisplacement pump of the general type toward which the preferred embodiment of this invention, as described more fully below, is directed by way of example. Somewhat more particularly, reference is made to the aforementioned U.S. Pat. Nos. 3,888,420 and 5,205,378, as well as earlier U.S. Pat. No. 3,421,600, and to co-pending application Ser. No. 08/570,806, whose disclosures address or refer to pumps of this type which are commercially available as of the present date.

The reciprocal piston-type positive-displacement pumps noted above incorporate cylindrical pin-like piston members which are moved back and forth through a closely-fitting chamber into which the liquid to be metered out by the pump is conveyed, usually through a lateral passage which opens into the metering chamber. Typically, the chamber fills during the return stroke of the piston, and the charge of liquid which has entered the chamber is then forced out by the forward stroke of the pin or piston. In this manner, precise volumetric charges of liquid are repeatedly ejected from the pump, with the particular volume of the ejected liquid charges corresponding directly to the effective volume of the metering chamber. Accordingly, the size of the metered volumes may be changed by changing the effective size of the metering chamber, and one known way of doing this (apart from simply resizing the chamber and piston) is to vary the length of the piston stroke. This may be accomplished in various ways, such as by changing an actuating cam, electrical solenoid, or compressed air charge used to reciprocate the piston (which is usually spring-loaded for its return stroke); however, another and simpler way of doing this is to incorporate some sort of mechanical adjustment feature, such as by threading the piston pin itself, on the portion thereof external to the metering chamber and valve body containing the latter, and then threading a nut or other such member onto the threaded portion of the piston pin, and using the nut as a stop member by letting it contact some fixed referenced point (an example of this being shown in the aforementioned co-pending application Ser. No. 08/570, 806).

Various difficulties, in conveniences or limitations are typically presented by such prior art apparatus. For example, those involving cam changes and the like are difficult and time consuming to implement, and are limited in the degree of variability from one configuration to the next. Other types of mechanisms are less complicated but often imprecise and difficult or inconvenient to use. The use of threaded piston rods and the like, as noted above, has the virtue of simplicity and continuous variability, but it may well involve difficult or limited access, inadvertent and undesired changes in the position of parts thought to have been placed where desired, and the lack of any meaningful indicia relating one position of adjustment with another.

THE PRESENT INVENTION

The present invention constitutes a significant and novel improvement over the state of the art as noted above, and in a preferred embodiment provides a positive-displacement liquid-metering pump having a continuously variable output controlled by readily and conveniently manipulated apparatus incorporates an effective and meaningful Vernier-type mechanical readout, by which different positions of varied adjustment may readily be correlated with one another and desired increments of adjustment more precisely and readily made.

Accordingly, in a first and preferred embodiment of the invention, the pump mechanism is mounted in a valve body or housing and uses a longitudinally reciprocable piston pin which carries a fixed stop element along its length at a predetermined point. A barrel-like adjustment mechanism having a longitudinal passage is telescoped over the piston pin and threadedly engaged with a corresponding threaded member carried by the valve body. The barrel-like member has an end surface against which the fixed stop on the piston rod comes into limiting abutment during the ejection stroke of the piston rod. Accordingly, by changing the threaded position of the barrel-like adjustment member relative to the threaded receiving part with which it is engaged, the length of the pump stroke may be effectively and continuously varied, even by very small increments. Preferably, such adjustment of the barrel-like member is accomplished by incorporating a knurled or other such roughened portion on its outer periphery, to provide enhanced manual gripping characteristics which make the adjustment more easy. In some embodiments, the knurled or other such portion may be in the form of a thumb-wheel or the like. Preferably, in all embodiments the threaded portions of the adjustment barrel and/or of its receiving member are made to be sufficiently prominent as to constitute a viewing scale in the nature of Vernier scale, whereby the extent of any given adjustment may readily be seen as the adjustment is being made, corresponding numbers or the like being a useful additional feature. The adjustment means (barrel-like member and its receiver) may be located on the outside of the metering block or valve body, for enhanced accessibility and usefulness, as well as for convenient and practical implementation.

The foregoing major objectives and advantages of the invention will become more apparent upon consideration of the ensuing specification, taken in conjunction with the appended drawings, all directed toward a particular preferred embodiment.

DETAILED DESCRIPTION OF PREFERRED EMBODIMENT

Figures 1, 2, 3, 3A:
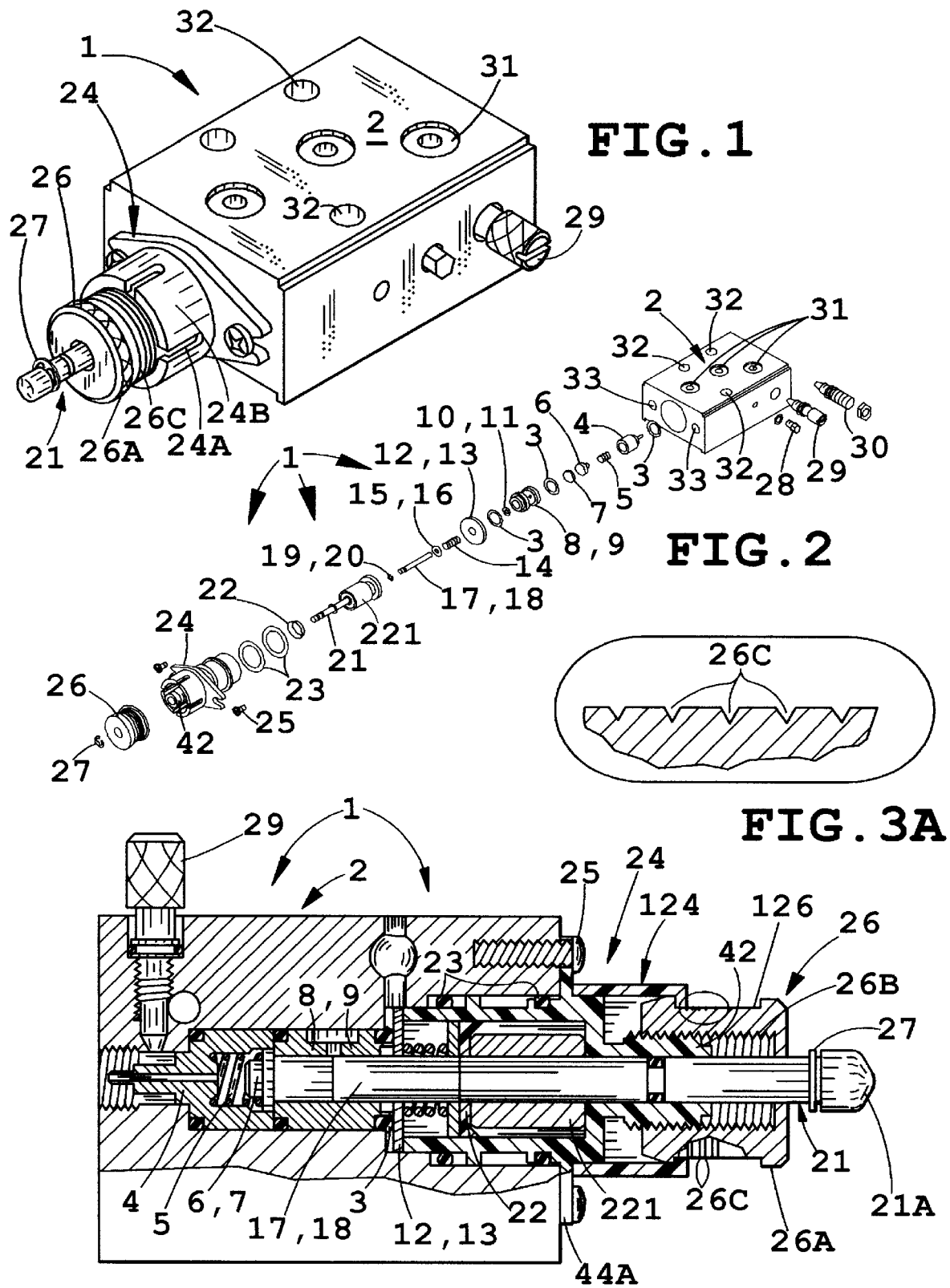
FIG. 1 is a perspective view showing the overall assembly of a preferred embodiment of the invention.
FIG. 2 is an exploded perspective view on a reduced scale of the structure shown in FIG. 1, illustrating substantially all internal components.
FIG. 3 is an enlarged side elevational view of the structure shown in FIG. 1, in partial central section.
FIG. 3A is an enlarged, fragmentary view showing the structure within the circled area in FIG. 3.

As mentioned above, positive-displacement, ejector-type pumps of the type noted represent a first or preferred application of the invention disclosed herein, and an example thereof is generally shown in FIGS. 1 and 2. That is, these figures show a metering pump assembly generally designated by the numeral 1, which includes a body 2, a group of parts 3–21 inclusive (specifically identified below) which together form the pump apparatus per se, and a group of parts designated generally by the numerals 22–27 inclusive, which illustrate a preferred implementation of the very precise, controllable, continuously variable apparatus for controlling and varying the output of the pump, in accordance with the invention.

While many of the particular parts referred to above are described hereinafter in more detail, a brief nomenclature of these parts is as follows. With principal reference to FIG. 2, the various parts designated by the number 3 are O-rings, part number 4 is a check valve housing, part number 5 is a check valve spring, part number 6 is a check valve body, part number 7 is a check valve seal, part number 8, 9 is an insert body (which provides a metering chamber), part number 10, 11 is an O-ring, part number 12, 13 is a washer, part number 14 is a return spring, part number 15, 16 is a washer, part number 17, 18 is a liquid-metering pin or piston, part number 19, 20 is a retaining clip, part number 21 is a push rod assembly having a cylindrical bushing 221 disposed along its length, part number 22 is a u-cup seal, part number 23 is an O-ring, part number 24 is an end cap, parts numbered 25 are machine screws, part number 26 is an adjustment knob, part number 27 is a retaining clip, part number 28 is a drain plug with gasket, part number 29 is a metering screw and part number 30 is an alternative meter screw with a jam nut.

In addition to including the parts or elements enumerated above, it is noted that the body 2 is made to be stacked in vertical arrangement with other such bodies (not specifically illustrated but discussed in certain of the reference materials noted above) for fluid transfer and the like in particular applications of the device. Thus, body 2 includes a plurality of recessed areas 31 comprising open-ended fluid transfer passages with concentric larger-diameter recesses to receive an O-ring or other such seal for preventing leakage between adjacent such bodies when so stacked. Also, body 2 includes through-bores 32 for receiving fasteners (e.g., bolts or machine screws, etc.) to hold such a stacked assembly of bodies 2 together.

A cross-section of the assembled pump 1, including all of the various parts illustrated in exploded form in FIG. 2, is shown in FIG. 3 for the sake of completeness, although it will be understood that the inner structure and basic operation of the pump itself is already known, and not in and of itself a feature of the present invention, other than being part of its overall implementation in a preferred form. Accordingly, certain of the elements illustrated in FIG. 2 are designated by corresponding numerals in FIG. 3, from which the operational assembly of the various parts shown in FIG. 2 will be observable. For more detailed information, one may refer to the above-noted reference materials and to commercially available products of this type, as for example are obtainable from Applicant's related company, Uni-Mist, Inc., a/k/a UNIST, Inc., 4134 36th Street SE, Grand Rapids, Mich. 49508.

Figure 4:
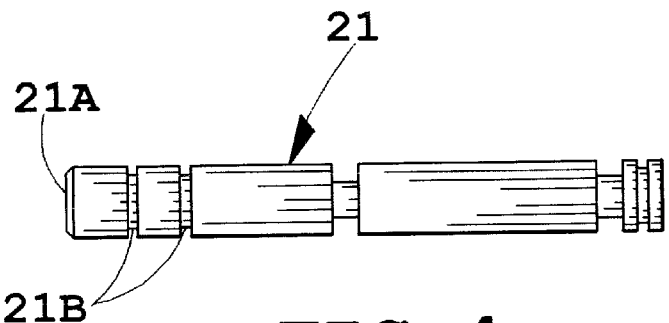
FIG. 4 is an enlarged side elevational view showing an exemplary metering piston.

Individual parts comprising the apparatus in accordance with a preferred embodiment of the invention for enabling the metering pump assembly 1 to be precisely and continuously variable are shown in FIGS. 4–8 inclusive, pertaining generally to the end cap 24 and adjustment knob 26, which are also shown in FIGS. 1–3 inclusive. More particularly, FIG. 4 is an enlarged side view of the push rod 21, which projects endwise out of body 2 (FIGS. 1, 2 and 3) and has an outer end extremity 21A (which may carry a plastic or other such cap 121) against which an external actuator (not shown) may bear to mechanically push the rod 21 longitudinally within a receiving bore inside body 2 and thereby move an internal piston pin 17,18 (FIGS. 2 and 3) through a metering chamber 8, 9 inside the body, to thus displace a measured volume of liquid. Push rod 21 passes through end cap assembly 24 and adjustment knob 26, which has a barrel-like configuration with a central passage through which push rod 21 projects (FIG. 3). When the pump is actuated and push rod 21 is moved inwardly of body 2 (to the right as shown in FIG. 1 and left as shown in FIG. 3), the allowable travel of push rod 21, and hence the length of the pump stroke imparted to piston pin 17, 18, is limited by abutment of the stop ring or spring clip 27 against the end face of adjustment knob 26. Consequently, as will be appreciated, changes in the relative positioning of clip 27 and/or adjustment knob 26 will therefore bring about corresponding changes in the pump stroke and the volume of the pulse-type charges making up the pump output.

In accordance with the invention, a preferred way of gradually and continuously effecting such changes, to correspondingly vary the pump stroke and resulting pump output volume, is by providing a variable coupling, i.e., a threaded connection between adjustment knob 26 and end cap 24, and also preferably by providing a convenient and readily gripped portion about the exterior of adjustment knob 26, as for example by knurling a raised circumferential band 26A. Preferably, this threaded connection is implemented by a relatively fine and high-pitch thread (e.g., size 32), and also by taking measures to provide a non-stick and frictionally retained inter-engagement between the parts of involved. For example, the adjustment knob 26 may be manufactured of brass, and the end cap 24 implemented by use of a suitable polymeric material, currently contemplated as being Acetal. Furthermore, the outwardly protruding generally tubular extremity 124 of end cap 24 is made to be at least stiffly flexible in a radial direction by providing a series of axially extending slots 24A in it, and sizing the inside diameter thereof slightly smaller than the outside diameter of adjustment knob 26. In this manner, a series of adjacent stiffly flexible fingers 24B are provided which at least lightly grip the outside of the adjustment knob 26, and thus ensure that rotation of adjustment knob 26 requires at least a minimum degree of force, to ensure against inadvertent charges and also provide for continuous retention of each selected position of adjustment, even in the presence of vibration, etc. Further, if such preferred material choices and size constraints are followed, the threaded movement of the brass adjustment knob 26 relative to the end cap 24 is smooth and stick-free, permitting easy, true and continuous relative motion therebetween, to effect corresponding accurately controllable and extremely minute adjustments in the pump stroke and corresponding fluid output.

Figure 8:
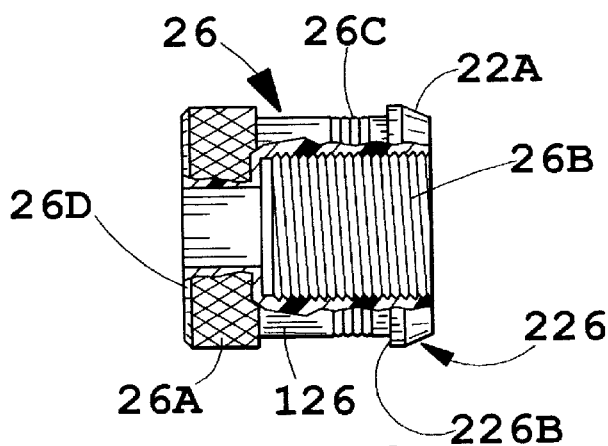
FIG. 8 is an enlarged side elevation showing the barrel-like adjustment mechanism.
Figure 8A:
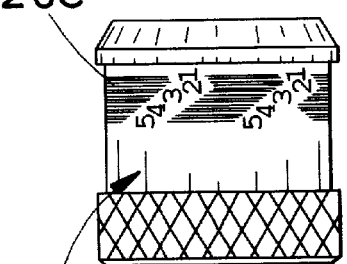
FIG. 8A is a detailed plan view showing an exemplary form of the visual indicia preferably included in the adjustment mechanism.

In order to provide a useful visual display of such adjustments, a series of annular scribes or shallow grooves 26C are preferably formed circumferentially along the outside of adjustment knob 26 (FIGS. 1 and 3), and in a still further preferred embodiment these indicia may be labelled, as shown in FIG. 8A, and correlated with particular quantitative stroke or pump displacement information. As will be readily appreciated, annular adjustment of knob 26 moves the indicia lines 26C under the end extremity of end cap fingers 24B, to thereby provide an immediate, convenient and highly useful visual gauge as to the exact extent of adjustment being made at any particular time.

Figure 5A:
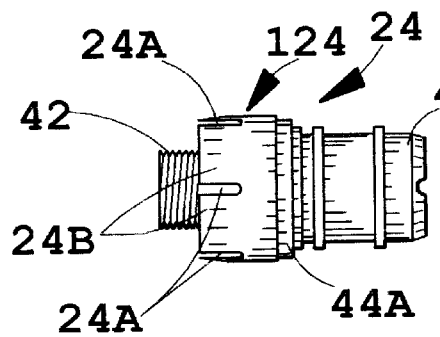
FIG. 5A is an enlarged side elevation showing the receiver for the adjustment mechanism.
Figure 5B:
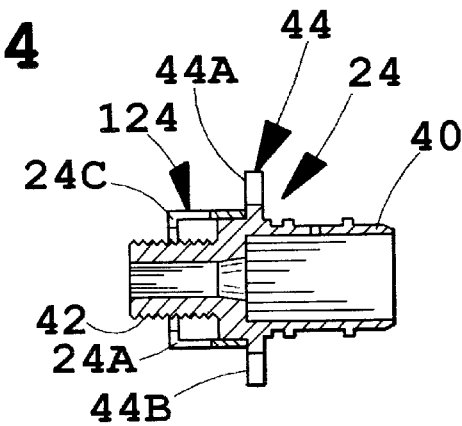
FIG. 5B is a central sectional view of the structure shown in FIG. 5A.
Figure 6:
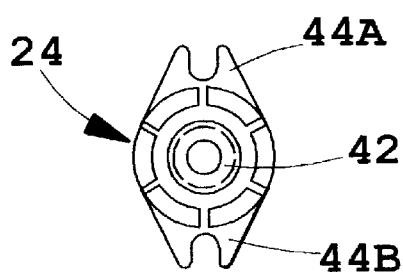
FIG. 6 is an end elevation of the structure shown in FIGS. 5A and 5B.
Figure 7:
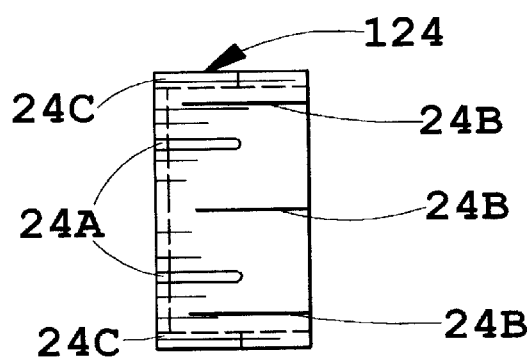
FIG. 7 is a further enlarged side elevation showing a portion of the structure shown in FIGS. 5A and 5B.

Further aspects and particular details of the apparatus referred to above are shown in FIGS. 5A, 5B, 6, 7, 8 and 8A, as well as in the longitudinal cross-section shown in FIG. 3. Referring more particularly to FIGS. 5A, SB and 6, it will be seen that end cap 24 includes a tubular portion 40 which extends into pump body 2 to surround the push rod assembly 21, together with an oppositely-extending tubular portion 42 which projects outwardly from pump body 2 (See FIGS. 1 and 3, for example). Between these two portions, a generally flat attachment flange 44 extends outwardly in a radial direction. When the end cap assembly 24 is in position and mounted upon valve body 2, the attachment flange 44 rests flush against the adjacent face of valve body 2 (FIGS. 1 and 3), and it is configured to provide a pair of oppositely directed mounting tabs 44A, 44B (FIG. 6), through which mounting screws 25 pass to engage corresponding threaded apertures 33 in the face of body 2, thereby securing the end cap 24 in the desired position.

End cap assembly 24 also includes an outwardly projecting tubular outer skirt portion 124 (FIGS. 5A and SB) which surrounds the aforementioned projecting portion 42 and contains the above-described slots 24A which define the flexible fingers 24B. This tubular surrounding skirt portion 124 may be (and preferably is) formed as a separate piece from the remainder of the end cap assembly 24 and then secured in the position shown in FIGS. 5A and 5B, as by ultrasonically welding the two together along their contiguous annular points of engagement (as pointed out by the circled area shown in the lower center of FIG. 5B). As also shown in this figure, outwardly projecting tubular portion skirt 124 preferably has a hooded outer end extremity 24C formed by an annular end flange which is directed radially inwardly, for purposes discussed further below. The projecting tubular portion 42 is threaded along its cylindrical outer periphery, as also discussed below.

As noted above, the adjustment knob 26 extends into the open outer end of end cap assembly 24, and these two parts are threaded together for relative axial adjustment in a smooth and continuously variable manner. This is accomplished in accordance with the preferred embodiment under discussion by providing threads 26B (FIGS. 3, 5B, and 8) along the open cylindrical interior of adjustment knob 26, in particular inside its tubular skirt portion 126, and this threaded cylindrical interior is sized so as to receive and engage the threaded outwardly projecting portion 42 of end cap 24, preferably in a manner which requires at least a minimal amount of radially outward flexing of the finger portions 24B. This assembly is best shown in FIG. 3. As previously indicated, the cylindrical outside surface of adjustment knob skirt portion 126 preferably carries a series of annular scribes or grooves 26C, which may be numbered or otherwise designated as shown in FIG. 8A. This provides a useful visual gauge which immediately shows the position of relative adjustment between adjustment knob 26 and end cap 24, which is directly indicative of the pump stroke setting and corresponding volume of pump discharge on each stroke. Thus, an operator may readily observe the amount of change being made as adjustment knob 26 is rotated, by simply noting the progressive movement of the different scribe marks 26C relative to the flat outer end surface of end cap portion 124, i.e., the outside surface of the hooded portion 24C (illustrated in FIGS. 1 and 3).

A further feature of this preferred adjustment knob structure is the annular extremity 226 (FIG. 8), which preferably has a conically tapered front portion 226A and a generally planar annular shoulder 226B disposed on its opposite side generally adjacent the last of the scribed indicating marks 26C. The conically tapered portion 226A is useful in assembling the adjustment knob 26 upon the threaded tubular portion 42 of end cap assembly 24, in that it will engage the innermost annular extremity 24C of the hooded flange portion 124 and gradually spread the flexible fingers 24B outwardly as the adjustment knob 26 is progressively threaded inwardly along portion 42 of end cap 24. At the point when the adjustment knob 26 has been threaded along portion 42 sufficiently to have brought shoulder 226B inwardly beyond the hooded flange portion 24C, the flexible fingers 24B will snap radially inward to snugly engage the cylindrical exterior of skirt portion 126, providing frictional resistance to relative movement which insures that inadvertent changes will not be made and that desired adjustments will be maintained in the presence of vibration, etc., the flexible finger portions 24B still preferably being under at least a slight amount of radially outward resilient deflection. Further, the annular shoulder 226B and the innermost extremity of hooded portion 24C will ultimately come into mutual contact when adjustment knob 26 is rotated in the opposite direction relative to the end cap 24, whereby a positive stop is provided which will limit such opposite rotation and prevent inadvertent disengagement of the adjustment knob 26 from the end cap 24. Relative travel of adjustment knob 26 in the opposite forward direction is positively limited by abutting contact made between the inner end of knob 26 and end cap 24, at the base of portion 124 (FIG. 3).

A further feature of the preferred embodiment under discussion resides in the fact that the length of push rod 21 and position of annular undercuts or grooves 21B formed therein (FIG. 4) which receive the retaining clips 27 is preferably such that when one such clip is positioned in the receiving slot 21B closest to end extremity 21A, the point of engagement between the clip and the outermost face 26D of adjustment knob 26 results in a predetermined minimal volume of pump output even at the point where knob 26 has been rotated to the position shown in FIG. 3, i.e., maximum projection outward from end cap 24, equivalent to minimum pump stroke. This will ensure that at least this minimal amount of lubricant or coolant is dispensed from the pump regardless of the relative adjustment of knob 26, to thereby guard against accidentally shutting the pump off and allowing the parts to be lubricated to run dry and be damaged or destroyed. Since it is necessary or desirable in at least some instances to provide a position where complete shut-off of the pump can if desired be intentionally accomplished, the second such positioning slot 21B is provided at a point further along the length of the push rod 21 so that the retaining clip 27 may be deliberately placed in a position where the push rod is disabled from moving in a stroke motion which will cause a pump output.

From the foregoing, it will be readily apparent that a novel and highly advantageous improvement has been provided which may be utilized in many particular types of reciprocating pumps, whereby a Vernier-like continuous adjustment may be made in the volume of the pump output, and selected positions of such adjustment are positively indicated and maintained against inadvertent change. As will be appreciated by those skilled in the art, when this is used in conjunction with an injector-type (reciprocal piston rod, positive-displacement) pump, which provides a very specific volumetric discharge upon each actuation stroke, extremely minute adjustment of the repetitive output volumes can be provided, whereby the output of the device can be minimized and adjusted in tiny increments to insure sufficient lubrication with essentially no excess. This not only helps achieve economic advantage due to the elimination of waste, but it also and perhaps even more importantly helps to provide a cleaner and safer workplace requiring less maintenance, clean-up, etc., while reducing undesired environmental pollution due to the discharge of excess lubricants, etc., and the inevitable passage of such excesses into the environment.

With respect to the particular description of the preferred embodiment set forth above, and with respect to terminology used elsewhere herein, including the claims, it is to be pointed out that in a more general sense the push rod 21 and piston pin 17, 18 could in certain instances be one and the same member, or an integrated unitary such member; consequently, the term "piston-actuator" should be understood as potentially being simply a portion of the piston itself and/or a device in the nature of the push rod, with or without its cylindrical actuation extremity 21A. Further, the position-limiting clip 27 may be considered a "stop structure" associated with the piston and/or piston-actuator, the adjustment knob 26 may be considered an "indexing member" having a portion engageable with the "stop structure," and the threaded connection or engagement between the end cap assembly 24 and adjustment knob 26 may be considered a continuously variable coupling which in certain embodiments could be operatively disposed between the adjustment knob/indexing member and the body, inasmuch as the end cap assembly may be considered a part of the body and in fact could be made part of the same or in any event made more integrally associated with the body, even to the point of being disposed internally thereof. Of course, in some embodiments the body could be made to encompass the end cap assembly and all or portions of the adjustment knob, except that some access to at least the knurled or other such tactile part of the latter would have to be provided, either by an appropriate recess or opening in the body or extended body, or otherwise. Of course, in conjunction with terminology referring to such a continuously variable coupling, the end cap assembly 24 could be considered a "coupling member."

It is to be pointed out once again that while the foregoing disclosure addresses a particular preferred embodiment, and best mode, the particular apparatus described and the various detailed aspects thereof noted are regarded as pertaining to only the most preferred version of the invention and to merely illustrate the principles and concepts involved in the invention, other embodiments and versions of the invention no doubt being feasible and potentially appropriate in other circumstances. It should therefore be understood that the foregoing description of a particular preferred embodiment is provided for purposes and illustration, and not as a measure of the invention, whose scope is to be defined solely by reference to the ensuing claims. Embodiments of the invention differing from those set forth above which nonetheless utilize the underlying concepts of the invention and incorporate its spirit should therefore be considered as within the scope of the claims appended below, unless such claims by their language specifically state otherwise.

The invention claimed is:

1. A positive-displacement liquid-metering pump having a continuously variable output, comprising in combination:

a valve body having a metering chamber and a reciprocable piston movable through said chamber to positively displace a volume of liquid therefrom, said displaced volume comprising the output of said pump;

a piston-actuator disposed in alignment with said piston to move it through said chamber in response to an applied force, said piston-actuator extending outwardly of said valve body, and a stop structure associated with said piston-actuator to limit its allowable movement;

an indexing member disposed in alignment with said stop structure and having a portion engageable therewith to limit the allowable movement of said piston-actuator and thereby define the length of stroke of said piston through said chamber; and a continuously variable coupling operatively disposed between said indexing member and said valve body for changing the effective position of said stop structure relative to said valve body and thereby changing the allowable movement of said piston-actuator and the stroke length of said piston.

2. A pump in accordance with claim 1, wherein said continuously variable coupling comprises a coupling member carried by said valve body and a threaded engagement between said coupling member and said indexing member.

3. A pump in accordance with claim 1, wherein said indexing member has a passage for receiving a portion of said piston-actuator.

4. A pump in accordance with claim 3, wherein said indexing member extends over and is telescopingly disposed about said piston-actuator.

5. A pump in accordance with claim 4, wherein said indexing member includes a generally tubular wall which extends axially of said piston-actuator and is disposed telescopingly over it.

6. A pump in accordance with claim 5, wherein said continuously variable coupling comprises a coupling member carried by said valve body and a threaded engagement between said coupling member and said indexing member.

7. A pump in accordance with claim 6, wherein said generally tubular wall of said indexing member is threadedly engaged with said coupling member.

8. A pump in accordance with claim 7, wherein said generally tubular wall of said indexing member carries threads on its inner surface and said coupling member includes a generally cylindrical surface having a threaded outer surface for engaging said threads of said indexing member.

9. A pump in accordance with claim 8, further including a series of visual indicia carried on at least one of said indexing member and said coupling member for indicating the relative position of said members as said threaded engagement is varied.

10. A pump in accordance with claim 9, wherein said coupling member includes an indexing indicator disposed in alignment with said series of visual indicia for visual alignment therewith to read said relative position.

11. A pump in accordance with claim 10, wherein said indexing indicator comprises a wall overhanging said indexing member, said visual indicia being located on said indexing member and said wall having an edge aligned with said visual indicia as a reference point.

12. A pump in accordance with claim 11, wherein said wall edge and said visual indicia provide a Vernier scale.

13. A positive-displacement liquid-metering pump having a continuously variable output, comprising in combination:

a valve body housing a metering chamber and a reciprocable piston movable through said chamber to positively displace a volume of liquid therefrom, said displaced volume comprising the output of said pump;

a piston-actuator disposed in alignment with said piston to move it through said chamber in response to an applied force, said piston-actuator extending outwardly of said valve body, and a stop structure associated with said piston-actuator to limit its allowably movement;

an indexing member having an abutment surface disposed along the periphery of said piston-actuator in alignment with said stop structure to be engageable therewith to limit the allowable movement of said piston-actuator and thereby define the length of stroke of said piston through said chamber, said indexing member including a generally tubular wall which extends axially of said piston-actuator and is disposed telescopingly over it; and a continuously variable coupling operatively disposed between said indexing member and said valve body for changing the effective position of said abutment surface relative to said valve body and thereby changing the allowable movement of said piston-actuator and the stroke length of said piston.

14. A pump in accordance with claim 13, wherein said indexing member defines an aperture through which said piston-actuator extends, said abutment surface comprising an edge of said aperture and said stop structure comprising a laterally extending formation carried on said piston-actuator.

15. A pump in accordance with claim 14, wherein said stop structure comprises a releasable member mounted on said piston-actuator.

16. A pump in accordance with claim 14, wherein said releasable member comprises a clip removably attached to said piston-actuator.

17. A pump in accordance with claim 16, wherein said piston-actuator comprises an elongated member having predetermined positions along its length for positioning said releasable member at different positions representing predetermined pump stroke lengths.

18. A piston-actuated liquid pump having a continuously variable pulse-type discharge volume, comprising in combination:

a valve body having a pumping chamber and a reciprocable piston movable through at least portions of said chamber to repeatedly eject a volume of liquid therefrom, said ejected volumes comprising the pulse-type output of said pump;

an actuator associated with said piston to move it within said chamber in response to an applied force, and a stop structure associated with at least one of said piston and actuator for limiting the allowable movement of said piston through said chamber;

an indexing member disposed in alignment with said stop structure and having a portion engageable therewith to limit the allowable movement of said piston and thereby define the length of stroke of said piston within said chamber; and a continuously variable coupling for changing the effective point of engagement of said stop structure and indexing member and thereby changing the stroke length of said piston and the corresponding volume of said pump output pulses.

19. A pump in accordance with claim 18, wherein said continuously variable coupling is operatively disposed between said indexing member and said valve body.

20. A pump in accordance with claim 19, wherein said continuously variable coupling is operatively disposed between said indexing member and said valve body comprising a coupling member carried by said valve body and a threaded engagement between said coupling member and said indexing member.

21. A pump in accordance with claim 20, further including a portion associated with said indexing member which extends outwardly of said valve body for access by an operator to selectively vary said threaded engagement between said indexing member and coupling member and thereby vary said pump output discharge volume.

22. A pump in accordance with claim 21, further including visual indicia observable outside said pump body for indicating the relative position of said indexing member and coupling member as said threaded engagement is varied.

23. A pump in accordance with claim 22, wherein said visual indicia comprises a series of marks carried by at least one of said indexing member and coupling member.

24. A pump in accordance with claim 20, including portions associated with said indexing member and said coupling member extending outwardly of said valve body and forming a micrometer-type Vernier scale and mechanism for varying said threaded engagement and corresponding pump stroke while usually indicating such variation.

25. A pump in accordance with claim 24, wherein said portions associated with said indexing member and coupling member comprise a generally tubular element mounted on said valve body and a generally cylindrical element telescopingly movable within said generally tubular element and threadedly mounted for such telescoping movement.

26. A pump in accordance with claim 25, wherein said generally cylindrical element carries a series of visual indicia for indicating the relative positions of said generally tubular element and said generally cylindrical element during said telescoping movement.

* * * * *